(12) United States Patent
Venkataraman et al.

(10) Patent No.: US 8,822,094 B2
(45) Date of Patent: Sep. 2, 2014

(54) FUEL CELL SYSTEM OPERATED ON LIQUID FUELS

(75) Inventors: Swaminathan Venkataraman, Cupertino, CA (US); Arne Watson Ballantine, Menlo Park, CA (US); David Weingaertner, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1089 days.

(21) Appl. No.: 11/730,540

(22) Filed: Apr. 2, 2007

(65) Prior Publication Data

US 2007/0231635 A1 Oct. 4, 2007

Related U.S. Application Data

(60) Provisional application No. 60/788,044, filed on Apr. 3, 2006.

(51) Int. Cl.
*H01M 8/04* (2006.01)
*H01M 8/02* (2006.01)

(52) U.S. Cl.
USPC ........... 429/440; 429/433; 429/434; 429/415; 429/416; 429/418; 429/419

(58) Field of Classification Search
None
See application file for complete search history.

(56) References Cited

U.S. PATENT DOCUMENTS

| | | |
|---|---|---|
| 3,488,266 A | 1/1970 | French |
| 4,041,210 A | 8/1977 | Van Dine |
| 4,182,795 A | 1/1980 | Baker et al. |
| 4,532,192 A | 7/1985 | Baker et al. |
| 4,670,359 A | 6/1987 | Beshty et al. |
| 4,792,502 A | 12/1988 | Trocciola et al. |
| 4,898,792 A | 2/1990 | Singh et al. |
| 4,917,971 A | 4/1990 | Farooque |
| 4,983,471 A | 1/1991 | Reichner et al. |
| 5,034,287 A | 7/1991 | Kunz |
| 5,047,299 A | 9/1991 | Shockling |
| 5,079,105 A | 1/1992 | Bossel |
| 5,084,362 A | 1/1992 | Farooque |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,366,819 A | 11/1994 | Hartvigsen et al. |
| 5,441,821 A | 8/1995 | Merritt et al. |

(Continued)

FOREIGN PATENT DOCUMENTS

DE 40 05 468 A1 8/1991
DE 199 24 777 A1 11/2000

(Continued)

OTHER PUBLICATIONS

U.S. Appl. No. 11/905,051, filed Sep. 27, 2007, Venkataraman.

(Continued)

*Primary Examiner* — Cynthia K. Walls (74) *Attorney, Agent, or Firm* — The Marbury Law Law Group PLLC (57) ABSTRACT

A fuel cell system includes a fuel cell stack, a heavy hydrocarbon fuel source, and a fractionator configured to separate light ends from heavy ends of a heavy hydrocarbon fuel provided from the heavy hydrocarbon fuel source.

10 Claims, 4 Drawing Sheets

(56) References Cited

U.S. PATENT DOCUMENTS

| | | | |
|---|---|---|---|
| 5,498,487 | A | 3/1996 | Ruka et al. |
| 5,501,914 | A | 3/1996 | Satake et al. |
| 5,505,824 | A | 4/1996 | McElroy |
| 5,527,631 | A | 6/1996 | Singh et al. |
| 5,573,867 | A | 11/1996 | Zafred et al. |
| 5,601,937 | A | 2/1997 | Isenberg |
| 5,612,149 | A * | 3/1997 | Hartvigsen et al. ............ 429/423 |
| 5,686,196 | A | 11/1997 | Singh et al. |
| 5,733,675 | A | 3/1998 | Dederer et al. |
| 5,741,605 | A | 4/1998 | Gillett et al. |
| 5,763,114 | A | 6/1998 | Khandkar et al. |
| 5,955,039 | A | 9/1999 | Dowdy |
| 6,013,385 | A | 1/2000 | DuBose |
| 6,051,125 | A | 4/2000 | Pham et al. |
| 6,254,839 | B1 * | 7/2001 | Clawson et al. ............. 422/190 |
| 6,280,865 | B1 | 8/2001 | Eisman et al. |
| 6,329,090 | B1 | 12/2001 | McElroy et al. |
| 6,348,278 | B1 | 2/2002 | LaPierre et al. |
| 6,403,245 | B1 | 6/2002 | Hunt |
| 6,423,437 | B1 | 7/2002 | Kenyon et al. |
| 6,436,562 | B1 | 8/2002 | DuBose |
| 6,451,466 | B1 | 9/2002 | Grasso et al. |
| 6,479,177 | B1 | 11/2002 | Roberts et al. |
| 6,492,050 | B1 | 12/2002 | Sammes |
| 6,531,243 | B2 | 3/2003 | Thom |
| 6,623,880 | B1 | 9/2003 | Geisbrecht et al. |
| 6,749,958 | B2 | 6/2004 | Pastula et al. |
| 6,821,663 | B2 | 11/2004 | McElroy et al. |
| 6,828,048 | B2 | 12/2004 | Margiott et al. |
| 7,303,598 | B1 * | 12/2007 | Namazian et al. .......... 48/197 R |
| 7,326,482 | B2 * | 2/2008 | Haltiner et al. ............... 429/415 |
| 7,452,619 | B2 | 11/2008 | Ahmed |
| 2001/0009653 | A1 | 7/2001 | Clawson et al. |
| 2001/0049035 | A1 | 12/2001 | Haltiner, Jr. et al. |
| 2002/0028362 | A1 | 3/2002 | Prediger et al. |
| 2002/0058175 | A1 | 5/2002 | Ruhl |
| 2002/0106544 | A1 | 8/2002 | Noetzel et al. |
| 2002/0136939 | A1 * | 9/2002 | Grieve et al. .................... 429/23 |
| 2002/0142198 | A1 | 10/2002 | Towler et al. |
| 2003/0129462 | A1 | 7/2003 | Yang et al. |
| 2003/0157386 | A1 | 8/2003 | Gottmann et al. |
| 2003/0162067 | A1 | 8/2003 | McElroy |
| 2003/0196893 | A1 | 10/2003 | McElroy |
| 2003/0205641 | A1 | 11/2003 | McElroy |
| 2004/0191597 | A1 | 9/2004 | McElroy |
| 2004/0202914 | A1 | 10/2004 | Sridhar et al. |
| 2004/0224193 | A1 | 11/2004 | Mitlitsky et al. |
| 2004/0224197 | A1 | 11/2004 | Kralick |
| 2004/0258587 | A1 | 12/2004 | Bowe et al. |
| 2005/0048334 | A1 | 3/2005 | Sridhar et al. |
| 2005/0164051 | A1 | 7/2005 | Venkataraman et al. |
| 2007/0231628 | A1 | 10/2007 | Lyle et al. |
| 2007/0231631 | A1 | 10/2007 | Venkataraman |

FOREIGN PATENT DOCUMENTS

| | | |
|---|---|---|
| EP | 1 057 998 B1 | 11/2003 |
| EP | 1 571 726 A1 | 9/2005 |
| EP | 1 258 453 B1 | 1/2007 |
| JP | 06-104002 A | 4/1994 |
| WO | WO 00/61707 | 10/2000 |
| WO | WO 2004/093214 | 10/2004 |
| WO | 2005/015674 A1 | 2/2005 |

OTHER PUBLICATIONS

U.S. Appl. No. 11/896,487, filed Aug. 31, 2007, Venkataraman.
Office Action received in U.S. Appl. No. 11/730,529.
Supplementary European Search Report mailed Nov. 4, 2009, received in European Application No. 07754708.1.
Office Action mailed Dec. 14, 2009, received in U.S. Appl. No. 11/730,529.
Office Action issued in European Patent Application No. 07754708.1, mailed on Feb. 28, 2012.

* cited by examiner

FUEL CELL SYSTEM OPERATED ON LIQUID FUELS

This application claims benefit of priority of U.S. provisional application No. 60/788,044 filed on Apr. 3, 2006, which is incorporated herein by reference in its entirety.

BACKGROUND OF THE INVENTION

The present invention is generally directed to fuel cells and more specifically to balance of plant components of high temperature fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

While diesel is a readily available fuel, it contains long chain hydrocarbons (Paraffins, Olefins, Napthenes and Aromatics) which are difficult to reform. Issues with reformation can lead to formation of coke within the reforming reactor. These formations can cause a failure of any system using diesel reformation. Use of diesel fuel within most types of fuel cell systems requires some sort of reformation process to convert the diesel to a hydrogen rich reformate or syngas ($CO+H_2$ mixture). Because of the problems with reformation, construction of a prior art fuel cell system powered by diesel fuel has been difficult.

Proposed solutions in the prior art use the concept of pre-reformation in which the diesel fuel is pre-conditioned, breaking larger hydrocarbons into smaller ones. The pre-reformation step is conducted in a catalyst containing pre-reformer via a catalyst mediated reformation reaction. Then, a subsequent standard reforming step is performed on the smaller hydrocarbons. This solution presents issues of thermal integration and can result in a loss of overall system efficiency. Furthermore, because a pre-reforming catalyst must be provided, the cost of the total system is increased.

SUMMARY

One embodiment of the invention provides a fuel cell system, comprising a fuel cell stack, a heavy hydrocarbon fuel source, and a fractionator configured to separate light ends from heavy ends of a heavy hydrocarbon fuel provided from the heavy hydrocarbon fuel source.

Another embodiment of the invention provides a method of operating a fuel cell system, comprising providing a heavy hydrocarbon fuel into a fractionator, separating light ends from heavy ends of the heavy hydrocarbon fuel in the fractionator, and providing the light ends to be used as fuel in a fuel cell stack.

DETAILED DESCRIPTION OF THE EMBODIMENTS

The embodiments of the invention provide a system which is capable of being operated on liquid fuels. Preferably, the system operates with high hydrocarbon fuels, such as diesel, (including low sulfur diesel and ultra low sulfur diesel), jet fuel (including JP-5 and JP-8 jet fuels), and kerosene (including low sulfur kerosene and ultralow sulfur kerosene).

Figure 1:
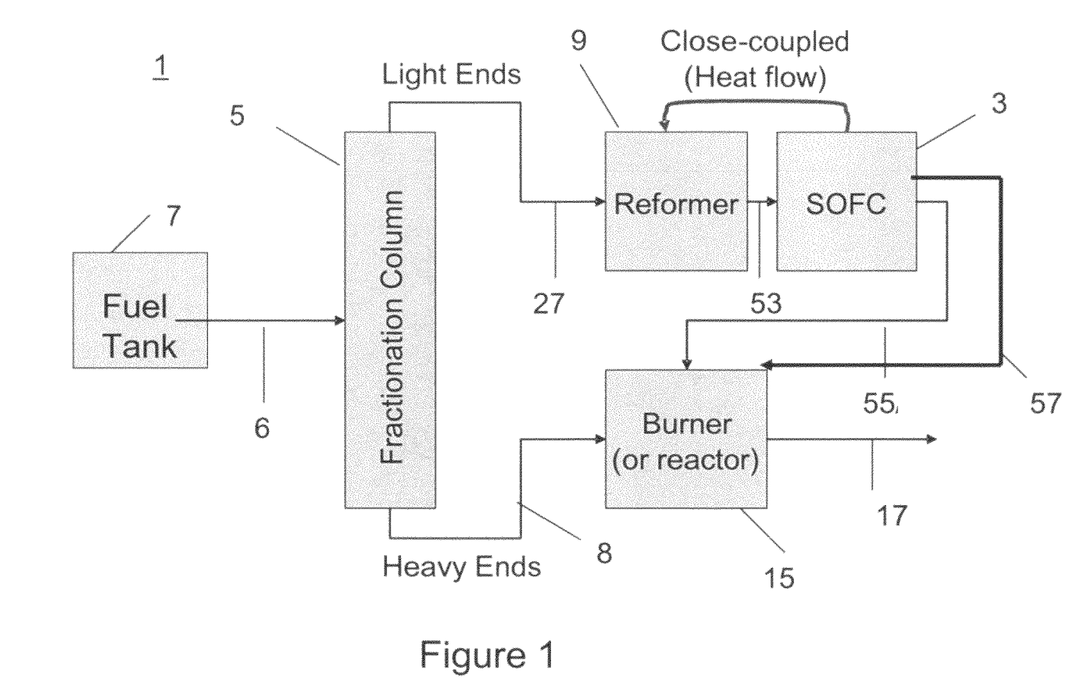
FIGS. 1-4 are schematics of a fuel cell system components according to embodiments of the present invention.

The embodiments of the invention provide the following elements for operation of a fuel cell system 1, such as a SOFC system, with high molecular weight hydrocarbon fuel, such as diesel and/or jet fuel. It is understood that hydrocarbon fuels normally contain traces of other besides hydrogen and carbon. The elements are illustrated in FIG. 1.

The system 1 contains a fractionator 5. This device separates the shorter hydrocarbon chain species of the high hydrocarbon (i.e., diesel or jet) fuel from the longer hydrocarbon chain species. These are referred to as "light ends" (predominantly C1 to C8 hydrocarbons) and "heavy ends". The light ends are sent to a reformer 9 while the heavy ends are sent to the burner 15. The fuel may be provided into the fractionator 5 through a conduit 6 from a storage vessel 7, such as a diesel or jet fuel tank. While this is not shown in FIG. 1, the fractionator 5 can be completely eliminated if the reformer 9 can handle higher hydrocarbons and hydrogen from anode exhaust gas is recycled to prevent potential coking. In this case, the conduit 6 connects the tank 7 directly to the reformer 9. A non-limiting example of a fractionator is a fractionation column, such as a distillation column containing trays and/or packing materials, of the type used in distillation of crude oil. The separation of the light and heavy ends in the fractionation column occurs by distillation of different ends in different zones of the column, with light and heavy ends being removed from different zones of the column.

The reformer 9 is preferably a close-coupled steam reformer. The reformer is preferably thermally integrated with a high temperature fuel cell stack or stacks 3, such as SOFC fuel cell stack. The reformer is positioned in close proximity to the SOFC cell stack so that product heat from the stack may be used to drive the reforming reaction in the reformer. U.S. Published Application US-2005-0164051-A1 filed as U.S. application Ser. No. 11/002,681 on Dec. 3, 2004, which is incorporated herein by reference in its entirety, describes and illustrates one example of thermal integration of stack and reformer. Any suitable reformer geometry and construction may be used, such as a metal foil type reformer, coated with catalyst, such as a Ni and Rh mixture. A reformer may comprise a catalyst coated fuel passage, such as a cylinder having the catalyst coated on its interior walls and/or on an insert in the reformer housing. The insert may comprise a catalyst coated tube, foil or wire. Other reformer geometry, such as a rectangular passage or other polygonal passages, may also be used. The reformer may be a steam reformer where the fuel is mixed with steam for a steam reformation reaction. The reformer 9 provides a reformed fuel (i.e., reformate), such as a hydrogen and CO containing syngas, into the anode inlet of the stack 3.

If desired, a hybrid reformer 9 for providing fuel flexibility for a fuel cell system described in U.S. provisional application No. 60/788,044 filed on Apr. 3, 2006, which is incorporated herein by reference in its entirety, may be used. Such a reformer is adapted to reform two or more different fuels that are used in the system. The reformer catalyst composition is optimized for handling different fuels. For handling high hydrocarbon fuel, such as diesel and jet fuel (including JP5 and JP8), less nickel is used to avoid coking. For handling lower hydrocarbon fuels, such as natural gas, methane, propane, methanol, ethanol, etc. more nickel is used. The hybrid reformer has two segments. The leading segment (i.e., the segment where the fuel enters the reformer) from the fuel inlet conduit 27 contains less nickel for reforming a high hydrocarbon fuel, such as diesel, and a trailing segment (i.e., the segment where the fuel exits the reformer) contains more nickel than the leading segment for reforming low hydrocarbon fuel, such as natural gas or methane. The trailing segment is connected to a reformed fuel outlet conduit 53. The leading segment contains a lower amount and/or concentration of nickel than the trailing segment. The reformer 9 may comprise a housing and one or more catalyst coated inserts to form the above described low and high nickel segments. The actual nickel amount and/or concentration in each segment can be optimized based on the actual fuel that will be used, the system geometry, temperature and other variables. The reaction kinetics of higher hydrocarbons reforming to methane is faster than the reaction kinetics of methane reforming to produce syngas. Furthermore, the hybrid reformer can also be used together with internal reforming type fuel cells, to allow more methane slippage either by reducing the number of inserts or reducing the coated area of nickel catalyst or by lowering the catalyst density or altering the catalyst concentration.

The system 1 also contains a fuel cell stack 3, such as a SOFC stack, which is a stack of solid oxide fuel cells. An anode inlet stream (i.e., the reformate stream) from the reformer 9 is directed through conduit 53 to the anode inlet of the SOFC stack 3. Oxidation air is provided from another source, such as an air blower or pump. The outlet air (i.e., the stack cathode exhaust stream), carrying product heat, may be passed over the exterior of the steam reformer elements in order to provide heat of reaction for reformation, as described, for example, in U.S. Published Application US-2005-0164051-A1. If the SOFC's are internal reforming type fuel cells, then the fuel reformation can take place at the fuel cell anodes or in the anode chambers, and the reformer 9 may be omitted.

The system 1 also contains a burner 15. This structure oxidizes the waste streams of both the fractionator 5 and the SOFC stack 3. In other words, the heavy ends from the fractionator 5 and one or both of the stack anode (i.e., fuel) or cathode (i.e., air) exhaust streams are provided to the burner 15 via conduits 8, 57 and/or 55 respectively. The waste heat from the burner can be used in two ways. The waste heat may be provided via conduit 17 to supply the reboiler duty of the fractionator 5 and/or warming up the cathode exhaust of the SOFC stack 3 to generate total useful heat for combined heat and power (CHP) applications. A catalytic reactor may be provided instead of a burner 15 in order to lower the formation of $NO_x$ species in the exhaust.

The 9 reformer is preferably located separately from but thermally integrated with the high temperature fuel cell stack 3 to support the endothermic reaction in the reformer 9 and to cool the stack 3. The system may also comprise a thermally integrated reformer 9, burner or combustor 15 and stack 3. The reformer 9 may be heated by the stack cathode exhaust, by radiative and/or convective heat from the stack and/or by the combustor heat during steady state operation.

The term "thermally integrated" in this context means that the heat from the reaction in the fuel cell stack 3 drives the net endothermic fuel reformation in the fuel reformer 9. The fuel reformer 9 may be thermally integrated with the fuel cell stack 3 by placing the reformer 9 and stack 3 in the same hot box and/or in thermal contact with each other, or by providing a thermal conduit or thermally conductive material which connects the stack 3 to the reformer 9.

The stack 3 generates enough heat to conduct the steam reformation reaction in the reformer during steady-state operation of the system 1. However, under some different operating conditions ranging from low to high stack efficiency and fuel utilization, the exothermic heat generated by the stack 3 and provided to the reformer may be greater than, the same as or less than the heat required to support the reforming reaction in the reformer. The heat generated and/or provided by the stack 3 may be less than required to support steam reformation in the reformer 9 due to low fuel utilization, high stack efficiency, heat loss and/or stack failure/turndown. In this case, supplemental heat is supplied to the reformer. The system 1 provides the supplemental heat to the reformer 9 to carry out the reformation reaction during steady state operation. The supplemental heat may be provided from the burner or combustor 15 which is thermally integrated with the reformer 9 and/or from a cathode (i.e., air) exhaust conduit which is thermally integrated with the reformer 9. While less preferred, the supplemental heat may also be provided from the anode (i.e., fuel) exhaust conduit which is thermally integrated with the reformer. The supplemental heat may be provided from both the combustor 15 which is operating during steady state operation of the reformer and/or during start-up and from the cathode (i.e., air) exhaust of the stack 3. For example, the combustor 15 may be in direct contact with the reformer, and the stack cathode exhaust conduit 55 is configured such that the cathode exhaust contacts the reformer 9 and/or wraps around the reformer 9 to facilitate additional heat transfer. This lowers the combustion heat requirement for the reformation reaction.

The reformer 9 may be sandwiched between the combustor 15 and one or more stacks 3 to assist heat transfer as described in more detail below. For example, the reformer 9 and combustor 15 may share at least one wall or be positioned sufficiently close to each other for radiative and/or convective heat transfer. The combustor 15 closes the heat balance and provides additional heat required by the reformer. When no heat is required by the reformer, the combustor unit acts as a heat exchanger. Thus, the same combustor (i.e., burner) 15 may be used in both start-up and steady-state operation of the system 1. When using combustion catalysts coated on the conduit walls, the fuel may be introduced at several places in the combustion zone to avoid auto ignition and local heating.

In operation of the system 1, the liquid fuel is provided from tank 7 though conduit 6 to the fractionator 5. In the fractionator 5, the heavy ends are separated from the light ends, with the light ends being provided through conduit 27 to the reformer 9, while the heavy ends are provided through conduit 8 to the burner 15. The light ends are reformed in the reformer 9 and are provided to the fuel cell stack 3 via conduit 53. The heavy ends are burned in the burner 15 together with anode and/or cathode exhaust streams from the fuel cell stack 3. If desired, the system 1 may also be operated on light hydrocarbon fuel, such as natural gas, methane, ethanol, etc. In that case, the light hydrocarbon fuel may be provided directly into the reformer 9 and the flow of the heavy hydrocarbon liquid fuel is switched off.

Sulfur is removed from the liquid fuel using sulfur adsorbents. During fractionation, significant portion of sulfur gets trapped in the "heavy-ends". Any slippage of sulfur in the "light ends" gets removed using a vapor phase sulfur guard. The vapor phase sulfur guard may not be required for ultralow sulfur kerosene or ultralow sulfur diesel.

In alternative embodiments, the hydrogen in the stack anode exhaust stream (i.e., the stack tail gas) may be recycled. Any amount of hydrogen left in the anode (i.e., fuel) exhaust stream can be used in two ways: (1) to reduce coke formation in the burner and/or (2) for hydrogenation of main fuel (i.e., recycling into the fuel inlet stream) to reduce longer chain hydrocarbons. The anode exhaust can be used with or without purification, as will be described in more detail below.

Figure 2:
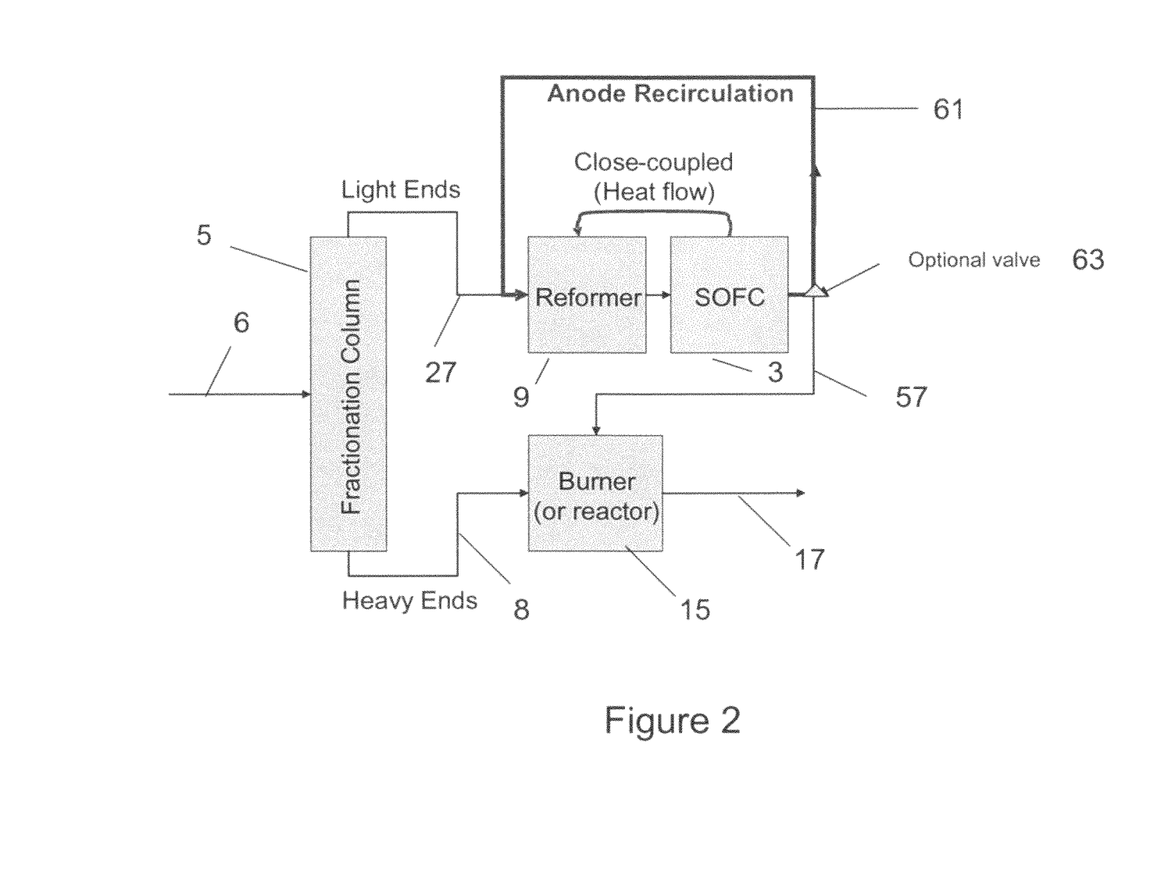

In one alternative embodiment shown in FIG. 2, the anode (i.e., fuel) exhaust stream recirculation is provided. A recirculation conduit 61 recirculates at least a portion of the anode exhaust stream of the SOFC stack 3 to the fuel inlet stream in the fuel inlet conduit 27. The recirculation element or elements are described in more detail, for example, in U.S. Published Application US-2005-0164051-A1. While this structure is advantageous because of the ability to recirculate product water in gaseous phase, it is also advantageous because the presence of hydrogen in the recirculated stream aids in the prevention of coke and soot formation in the reformer.

Preferably, the anode exhaust stream is provided into the fuel inlet stream prior to the fuel inlet stream entering the reformer. One or more valves 63 may be used to recycle only a portion of the anode exhaust stream into the fuel inlet stream while providing the rest of the anode exhaust stream into the burner 15. For example, the control system operated valve 63 adjusts the ratio of the amount of anode exhaust stream recirculated to the fuel inlet stream through conduit 61 to the amount of the anode exhaust stream provided to the burner 15 through the anode exhaust conduit 57. Furthermore, a blower or compressor may be used drive the recirculation. If desired, the cathode exhaust conduit 55 may be used to provide a separate cathode exhaust from the fuel cell stack 3 to the burner 15, as shown in FIG. 1. Various recirculation methods are described in more detail in U.S. application Ser. No. 11/491,487, filed on Jul. 24, 2006 (which claims priority to U.S. provisional application Ser. No. 60/701,976 filed on Jul. 25, 2005) and in U.S. application Ser. No. 11/188,120, filed on Jul. 25, 2005, all of which are incorporated herein by reference in their entirety.

Figure 3:
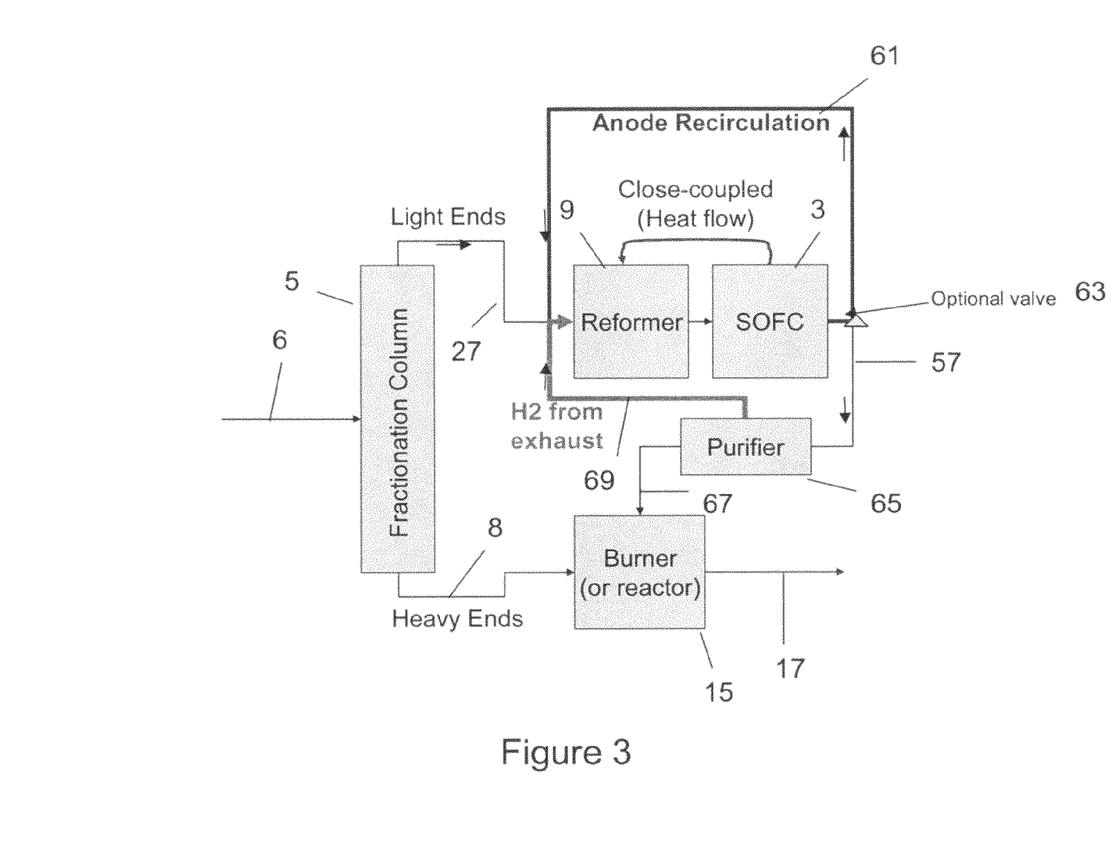

In another alternative embodiment shown in FIG. 3, the exhaust stream of the SOFC system may be purified to preferentially extract unreacted hydrogen or unreacted CO and $H_2$. This unreacted fuel may be recirculated to the fuel inlet stream. This provides the advantage of increased system efficiency and further avoidance of the formation of coke and soot by the increased hydrogen concentration in the reformer. The purified stream may also be only periodically recycled so that it may be used in the exhaust burner/reactor when needed, or in the reformer when needed. Thus, the hydrogen may be separated from the stack anode exhaust stream and recycled into the stack fuel inlet stream by using a hydrogen separator. For example, the stack anode exhaust from conduit 57 is provided into a hydrogen purifier or separator 65. The purified hydrogen is recirculated into the fuel inlet conduit 27 through conduit 69, while the remainder of the anode exhaust is provided to the burner 15 through conduit 67. If desired, an additional portion of the anode exhaust stream may be recirculated directly from the stack 3 to the fuel inlet stream in conduit 27 via conduit 61, as described above with respect to FIG. 2. Alternatively, conduit 61 may be omitted or closed by valve 63, and the entire anode exhaust stream is provided to the purifier 65.

When a higher rate of hydrogen introduction is required in order to prevent coke or soot formation, the system may be operated at a lower rate of fuel utilization. This will then mean that more hydrogen will remain unreacted in the SOFC anode exhaust. Cascaded stages of hydrogen purification may be provided in order to recirculate a greater fraction of the hydrogen present in the anode exhaust if desired. Methods of purification may include electrochemical pumping of hydrogen, pressure swing adsorption removal of impurities, thermal swing adsorption or partial pressure swing adsorption methods, as described in more detail in U.S. application Ser. No. 11/491,487, filed on Jul. 24, 2006 (which claims priority to U.S. provisional application Ser. No. 60/701,976 filed on Jul. 25, 2005) and in U.S. application Ser. No. 11/188,120, filed on Jul. 25, 2005, all of which are incorporated herein by reference in their entirety. The hydrogen purifier 65 may comprise an electrochemical membrane hydrogen separator, a pressure swing adsorption separator, a thermal swing adsorption separator or a partial pressure swing adsorption separator. Thus, all or part of the anode exhaust stream is purified and recycled into the fuel inlet stream. If desired, the purification step can be omitted and all or part of the unpurified anode exhaust stream is provided into the fuel inlet stream.

In another alternative embodiment, the system 1 can be started with diesel or with another liquid fuel such as ethanol, propane or another light hydrocarbon fuel, and brought to recirculation before switching to diesel or jet fuel. The advantage of the switch is that the anode gas can be recirculated. Thus, it may be possible to introduce diesel directly into the reformer with recycled hydrogen without the need for fractionator 5.

In another alternative embodiment, an internal combustion engine rather than a burner uses the heavy ends from the fractionator. Thus, the burner 15 is replaced with an engine. For example, in some uses of diesel fuel, there are concurrent demands for fuel by SOFC systems and internal combustion engines. When this is the case, the SOFC system may be configured to operate only on light ends fuels, and store heavy ends fuels for use in the internal combustion applications. Thus, rather than burning the heavy ends in the burner, the heavy ends are provided from the fractionator to a storage vessel, such as a fuel storage tank. The heavy ends are then provided from the storage vessel to the engine to be used as fuel. Alternatively, the storage tank can be omitted and the heavy ends may be provided directly to the engine.

Figure 4:
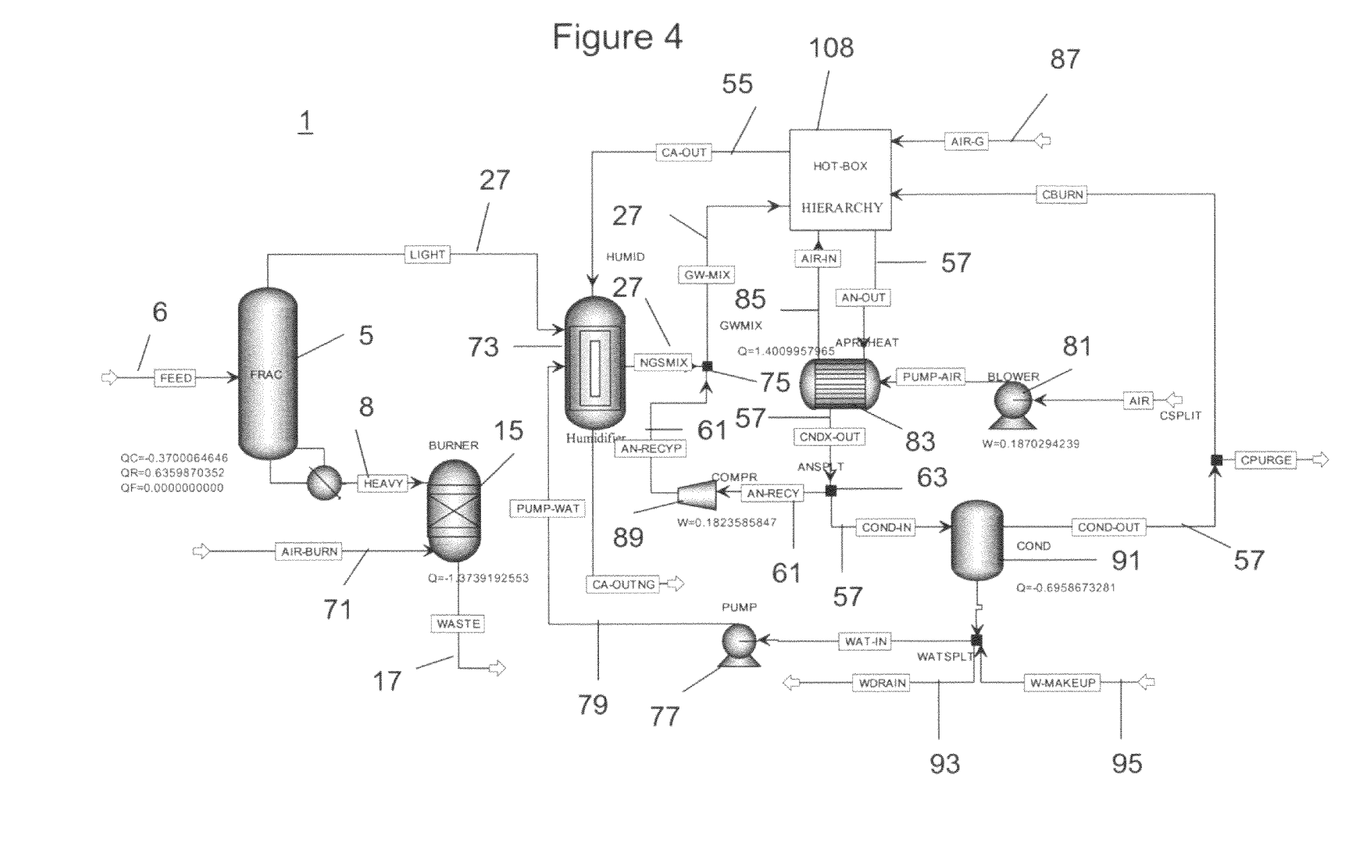

FIG. 4 shows a more detailed Aspen simulation showing heat balances of the system schematic with a fractionator 5 and anode exhaust gas recirculation, similar to the high level schematic shown in FIG. 2.

The system shown in FIG. 4 contains the elements described and illustrated above in FIG. 2, where "HOT BOX HIERARCHY" 108 refers to a hot box containing the thermally integrated stack 3 and reformer 9, plus any associated heat exchangers and other fluid handling components. The burner 15 may also be located in the hot box if desired. An air inlet conduit 71 is connected to the burner 15 to provide air to the burner to generate waste heat which can be used to heat other components, as described above. Alternatively, the cathode exhaust conduit 55 from the stack 3 may be used to provide air into the burner 15.

FIG. 4 also illustrates the following system components. The optional humidifier 73 humidifies the fuel inlet stream (i.e., the light ends from) with water vapor or steam. Any suitable humidifier, such as a membrane type humidifier may be used. A humidified fuel inlet stream is provided from humidifier 73 into a three way valve 75 where it is mixed with the pressurized recycled anode exhaust stream from the recirculation conduit 61. These mixed streams are provided into the reformer via conduit 27. A humid cathode (air) exhaust stream from the stack 3 may also be provided into the humidifier 73 via the cathode exhaust conduit 55. A water pump 77 provides water into the humidifier 73 via conduit 79. Humidity required for a sufficiently high steam to carbon ratio to avoid coking in the reformer, heat exchangers, or conduits can be provided by one or more of the following: a steam generator which provides steam into the fuel inlet stream in conduit 27; recycling of the fuel cell stack anode exhaust stream using the recycle conduit 61, as shown in FIGS. 2, 3 and 4; and/or by providing water to the fractionator 5. Preferably, the water is provided to the bottom of the fractionator 5 column to provide stripping steam for the fractionator column and to provide for a better separation of light and heavy ends (i.e., light and heavy fractions), or a higher yield of light end components. The water can be provided to the fractionator from pump 77 via a conduit or from another water source. The water provided to the fractionator can also be used to humidify the fuel inlet stream and to provide steam from steam-methane reformation in the reformer 9.

An air blower 81 provides the inlet air into an air heat exchanger 83 where it is heated by the stack anode exhaust stream provided via the anode exhaust conduit 57. The heated air inlet stream is then provided into the stack 3 via conduit 85. If desired, a separate air inlet stream can be provided into the stack 3 via conduit 87.

The anode exhaust stream exits the heat exchanger 83 into the three way valve 63 which splits the anode exhaust stream into two separate streams. The first stream is provided through conduit 61 into a compressor or blower 89 which provides the pressurized recycled anode exhaust stream to be mixed with the humidified fuel inlet stream, as described above. The second stream is provided from valve 63 into a condenser 91. In the condenser, the water in the stream is condensed and provided to the pump 77 or to the drain 93. If desired, additional water from a water inlet conduit 95 may also be provided to the pump 77. The remaining anode exhaust stream is provided from the condenser 91 back to the stack 3 or to be purged or to the burner 15 via conduit 57.

The system of the embodiments of the invention provides an ability to operate an SOFC system with diesel fuel. The system cost is believed to be lower relative to alternatives with diesel fuel. The system provides enhanced efficiency while operating on diesel fuel due to close coupling (i.e., thermal integration) of reformer and recirculation streams containing water and/or hydrogen.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A fuel cell system, comprising:
a fuel cell stack;
a heavy hydrocarbon fuel source;
a fractionator configured to separate light ends from heavy ends of a heavy hydrocarbon fuel provided from the heavy hydrocarbon fuel source;
a fuel reformer, wherein the fuel reformer is thermally integrated with the fuel cell stack by thermal conduction through a thermally conductive material such that heat resulting from a reaction in the fuel cell stack drives a net endothermic reaction in the fuel reformer, wherein the thermal conduction excludes heat provided from a cathode exhaust conduit of the fuel cell stack to the fuel reformer;
a burner or catalytic reactor;
a conduit feeding the light ends from the fractionator to the fuel reformer;
a conduit feeding a reformed fuel from the fuel reformer to the fuel cell stack;
a conduit feeding a first portion of an anode exhaust stream from the fuel cell stack to the burner or catalytic reactor;
a conduit recycling a second portion of the anode exhaust stream into a fuel inlet stream without purification of the anode exhaust stream; and
a conduit feeding the heavy ends from the fractionator to the burner or catalytic reactor.

2. The system of claim 1, wherein the fuel cell stack comprises a SOFC stack.

3. The system of claim 1, wherein the heavy hydrocarbon fuel source comprises a jet fuel tank.

4. The system of claim 1, wherein the heavy hydrocarbon fuel source comprises a diesel fuel tank.

5. A fuel cell system, comprising:
a fuel cell stack;
a first means for separating light ends from heavy ends of a heavy hydrocarbon fuel;
a second means for reforming fuel, wherein the second means is thermally integrated with the fuel cell stack by thermal conduction through a thermally conductive material such that heat resulting from a reaction in the fuel cell stack drives a net endothermic reaction for reforming fuel, wherein the thermal conduction excludes heat provided from a cathode exhaust conduit of the fuel cell stack to the second means for reforming fuel;
a third means for burning or catalytically reacting the heavy ends and a first portion of an anode exhaust stream from the fuel cell stack;
a fourth means for feeding the light ends from the first means to the second means;
a fifth means for feeding the first portion of the anode exhaust stream from the fuel cell stack to the third means;
a sixth means for feeding the heavy ends from the first means to the third means;
a seventh means for providing the light ends reformed by the second means to be used as fuel in the fuel cell stack; and
an eighth means for recycling a second portion of the anode exhaust stream into a fuel inlet stream without purification of the anode exhaust stream.

6. The system of claim 5, wherein the heavy hydrocarbon fuel comprises diesel fuel or jet fuel.

7. The system of claim 5, wherein the fuel cell stack comprises a SOFC stack.

8. The system of claim 5, wherein the second means is thermally integrated with the fuel cell stack by thermal conduction through the thermally conductive material between the second means and an anode exhaust conduit of the fuel cell stack.

9. The system of claim 1, wherein the fuel reformer is thermally integrated with the fuel cell stack by thermal conduction through the thermally conductive material between the fuel reformer and an anode exhaust conduit of the fuel cell stack.

10. A fuel cell system, comprising:
a fuel cell stack;
a heavy hydrocarbon fuel source;
a fractionator configured to separate light ends from heavy ends of a heavy hydrocarbon fuel provided from the heavy hydrocarbon fuel source;
a fuel reformer, wherein the fuel reformer is thermally integrated with the fuel cell stack by thermal conduction through a thermally conductive material between the fuel reformer and an anode exhaust conduit of the fuel cell stack;
a burner or catalytic reactor;

a conduit feeding the light ends from the fractionator to the fuel reformer;
a conduit feeding a reformed fuel from the fuel reformer to the fuel cell stack; and
a conduit feeding the heavy ends from the fractionator to the burner or catalytic reactor.

\* \* \* \* \*